2,746,906

CARBOXYMETHYL DEXTRAN ETHER-STABILIZED CONTRAST COMPOSITIONS

Leo J. Novak and Walter S. Hogue, Dayton, Ohio, assignors, by mesne assignments, to Midland Chemical Corporation, Dayton, Ohio, a corporation of Delaware No Drawing. Application April 5, 1954,
Serial No. 421,189

6 Claims. (Cl. 167—95)

This invention relates to a stable suspension useful in radiography of the internal organs.

In taking X-rays of the internal organs of the human body, it is the general practice to administer orally a suspension of a suspensoid base, such as barium sulfate, bismuth sulfate and the like, so that the organs through which the suspension passes are emphasized and outlined on the X-ray pictures. Considerable difficulty has been experienced in the use of these suspensions as a result of the tendency of the suspensoid base to settle more or less rapidly from the suspension or liquid employed. This results in undesirable contrasts in the picture, with the lower organs or parts thereof showing with maximum opacity while the upper organs or parts show with less opacity and may even show translucent. In addition, settling out of the suspensoid base results in deposition thereof in pockets in the viscera where it may cause irritation. A further effect of settling of the suspensoid base may be stopping of the lower passages of the system.

Various attempts have been made to stabilize the suspensions and avoid settling out of the suspensoid base by the incorporation of suspending aids. However, in most cases, undesirably large amounts of the suspending aid have been required for effective, reliable stabilization of the suspensions.

One object of this invention is to provide new suspensions for use in radiography in which the impervious component is supplemented by a suspending aid which, in very small amounts, effectively maintains the impervious ingredient in suspension in the composition.

Other objects and advantages will appear from the following description enumerating illustrative embodiments thereof.

In accordance with this invention, the impervious ingredients of the contrast composition, which may be of any of those materials of the type commonly used, such as barium sulfate, bismuth sulfate, etc., is supplemented by carboxymethyl dextran which functions as a suspending agent for preventing flocculation of the suspensoid particles.

The production of carboxymethyl dextrans is described in the pending application of Leo J. Novak, Ser. No. 346,016, filed March 31, 1953. In brief, the selected dextran and a carboxymethylating agent are reacted together in an aqueous alkaline medium whereby the carboxymethyl group is substituted for one or more hydroxyl groups in the dextran molecule. Suitable carboxymethylating agents are chloracetic acid, sodium chloracetate or chloracetamide, the reaction thereof with the dextran being carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for a time ranging from about ten minutes to two hours. Preferably, also, the molar ratio of sodium chloracetate or potassium chloracetate to dextran is between 2:1 and 12:1, the molar ratio of sodium hydroxide or potassium hydroxide to dextran is between 5:1 and 15:1, and the molar ratio of the water to dextran is between 70:1 and 120:1. The carboxymethyl dextrans obtained have a D. S. (degree of substitution or average number of carboxymethyl groups per anhydroglucopyranosidic unit) of less than 1:1 to 3:1.

The reaction produces a viscous mass comprising the sodium or potassium salt of the carboxymethyl dextran. This viscous mass comprising the salt of the ether may be precipitated from the crude reaction mass by a non-solvent for the salt, as by means of any water-miscible alcohol, e. g., methyl, ethyl, propyl, isopropyl or t. butyl or the salt of the ether may be precipitated from the reaction mixture by means of other organic, water-miscible solvents which do not dissolve the salt such as, for instance, acetone.

The free carboxymethyl dextran may be recovered from the salt by mixing the latter with water, acidifying to a pH of about 2.0, and precipitating the ether by means of acetone or a water-miscible alcohol as described above. The pH of 2.0 is not critical and other acid pH values may be used. However, the highest yields of the free ether have been obtained by precipitation at pH 2.0.

The dextran carboxymethylated may be obtained in various ways. It may be biosynthesized from sucrose by microorganisms of the *Leuconostoc mesenteroides* and *L. dextranicum* types, or their enzymes. Microorganisms (or their enzymes) which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The dextran is produced by introducing the microorganism or the filtered enzyme thereof into an aqueous sucrose-bearing medium and holding the mass until the dextran is synthesized in maximum yield, whereupon the dextran is precipitated as by the addition of a water-miscible aliphatic alcohol or acetone. The precipitated "native" dextran is preferably suitably purified and then reduced to fine powder form for carboxymethylation. This "native" dextran is normally characterized by a very high molecular weight which has been calculated to be in the millions. It may be carboxymethylated at the native molecular weight or it may be partially hydrolyzed to lower molecular weight dextran in any suitable way, as by acid or enzymically, and then carboxymethylated.

In all cases, relatively small amounts of the carboxymethyl dextran which may have a D. S. of less than 1, say 0.5:1 up to 3.0, and preferably has a D. S. of 2:1 to 3:1, are effective in stabilizing the suspensions of the impervious ingredient of the compositions to be used as orally ingested contrast medium in radiography, amounts between 0.2% and 5.0% on the weight of the composition being satisfactory.

A preferred carboxymethyl dextran for the present purposes is the ether derived from *Leuconostoc mesenteroides* B–512 native (unhydrolyzed) dextran and containing an average of 2.0 to 3.0 carboxymethyl groups per anhydroglucopyranosidic unit. This carboxymethyl dextran is preferred because of its striking effectiveness in stabilizing the aqueous suspension in extremely small concentrations. Thus, amounts of the ether between 0.2% and 0.5% stabilize the radiography suspensions. The preferred pH of the suspensions is between pH 5.0 and pH 9.5. At this pH range, the suspensions are stable for indefinite periods of time. Typical compositions comprise from 99.5% to 99.8% of aqueous barium sulfate or bismuth sulfate suspensions containing from 5% to 30% of the barium or bismuth salt and 0.2% to 0.5% of the unhydrolyzed B-512 carboxymethyl dextran. The dextran ether is much more effective as stabilizer than any of the available carboxymethyl celluloses. To achieve the same stabilizing effect as is obtained with 0.2% by weight of the B-512 carboxymethyl dextran using carboxymethyl cellulose, it is necessary to use at least 1.0% of the latter. The effectiveness of the carboxymethyl dextran at the low concentrations renders the compositions less costly and also insures that a higher proportion of the solid phase of the composition comprises the impervious contrast ingredient for outlining the organ or organs to be X-rayed.

The suspensoids used as impervious ingredients are most commonly supplied to the physician or hospital in finely divided dry solid form. The carboxymethyl dextran may be admixed with the powdered barium sulfate or the like and the mixture supplied as such for stirring into water to produce the ingestable composition. Or the suspensions may be prepared by stirring the finely divided impervious ingredients into water and then adding the carboxymethyl dextran with continued agitation. The suspensions are indefinitely stable under normal conditions.

The invention thus provides ingestable compositions in which the suspensoid base or impervious ingredient is maintained in suspension by the carboxymethyl dextran. Because of the stability of the suspensions, the suspensoid does not settle out as it passes through the body, the delineations of the organs X-rayed are of equal, uniform opacity on the X-ray picture and have the same cross-section. Moreover, varying cross-sections have varying opacity, which is desirable in order that the exact condition of the organs can be studied. The composition as a whole will pass through the system aided by the lubricating and laxative action of the bulky carboxymethyl dextran and the likelihood of the suspensoid base settling and being deposited in the viscera is eliminated. The carboxymethyl dextrans are odorless, tasteless non-toxic substances which may be orally ingested without harmful physiological side-effects.

The suspensoid base and carboxymethyl dextran may be mixed dry, in powder form, varying amounts and then mixed with water to obtain the aqueous suspension of desired base concentration usually between 5% and 30% and a stabilizing quantity of the carboxymethyl dextran. The dry powdered mixtures comprises a relatively high proportion of the suspensoid base and a relatively small proportion of the carboxymethyl dextran, the relative proportions of the ingredients of the dry mixture being such that, upon suspending it in water, the suspension contains the base and ether in the desired concentrations for use in radiography.

What is claimed is:

1. A stable, ingestable composition for use in radiography comprising from 99.5% to 99.8% of an aqueous suspension of barium sulfate containing from 5% to 30% of the sulfate and, as stabilizer for the suspension, from 0.2% to 0.5% of a carboxymethyl ether of native, unhydrolyzed dextran, said suspension having a pH between 5.0 and 9.5.

2. A stable, ingestable composition for use in radiography comprising from 99.5% to 99.8% of an aqueous suspension of bismuth sulfate containing from 5% to 30% of the sulfate and, as stabilizer for the suspension, from 0.2% to 0.5% of a carboxymethyl ether of native, unhydrolyzed dextran, said suspension having a pH between 5.0 and 9.5.

3. A dry powdered composition for use in radiography consisting of a mixture of a finely divided solid inorganic X-ray contrast material selected from the group consisting of bismuth sulfate and barium sulfate, and a carboxymethyl ether of native, unhydrolyzed dextran in a small amount such that, on suspension of the mixture in water, the suspension contains from 0.2% to 0.5% of the ether and is stabilized thereby.

4. A dry powdered composition for use in radiography consisting of a mixture of finely divided bismuth sulfate and a carboxymethyl ether of native, unhydrolyzed dextran in a small amount such that, on suspension of the mixture in water, the suspension contains from 0.2% to 0.5% of the ether and is stabilized thereby.

5. A dry powdered composition for use in radiography consisting of a mixture of finely divided barium sulfate and a carboxymethyl ether of native, unhydrolyzed dextran in a small amount such that, on suspension of the mixture in water, the suspension contains from 0.2% to 0.5% of the ether and is stabilized thereby.

6. A stable, ingestable composition for use in radiography comprising from 99.5% to 99.8% of an aqueous suspension of a finely divided solid inorganic X-ray contrast material selected from the group consisting of barium sulfate and bismuth sulfate containing from 5% to 30% of the sulfate and, as stabilizer for the suspension, from 0.2% to 0.5% of a carboxymethyl ether of native, unhydrolyzed dextran, said suspension having a pH between 5.0 and 9.5.

References Cited in the file of this patent
UNITED STATES PATENTS

| | | |
|---|---|---|
| 1,984,404 | Ellzey | Dec. 18, 1934 |
| 2,677,645 | Allen | May 4, 1954 |
| 2,680,089 | Lowy | June 1, 1954 |

OTHER REFERENCES

Manufacturing Chemist, August 1953, "Dextran and Its Derivatives," pgs. 330–333.